(12) United States Patent
Lisiecki et al.

(10) Patent No.: US 12,116,261 B2
(45) Date of Patent: Oct. 15, 2024

(54) BEVERAGE DISPENSING DEVICE WITH CLEANING VALVE

(71) Applicant: Micro Matic USA, Inc., Brooksville, FL (US)

(72) Inventors: Joseph Lisiecki, Spring Hill, FL (US); Patrick Nolan, Trenton, MI (US)

(73) Assignee: Micro Matic USA, Inc., Brooksville, FL (US)

( * ) Notice: Subject to any disclaimer, the term of this patent is extended or adjusted under 35 U.S.C. 154(b) by 141 days.

(21) Appl. No.: 17/685,686

(22) Filed: Mar. 3, 2022

(65) Prior Publication Data

US 2022/0281734 A1      Sep. 8, 2022

Related U.S. Application Data

(60) Provisional application No. 63/156,323, filed on Mar. 3, 2021.

(51) Int. Cl.
*B67D 1/07*     (2006.01)
*B67D 1/00*     (2006.01)
*B67D 1/14*     (2006.01)

(52) U.S. Cl.
CPC ......... *B67D 1/1444* (2013.01); *B67D 1/0004* (2013.01); *B67D 2001/0094* (2013.01); *B67D 2001/075* (2013.01)

(58) Field of Classification Search
CPC ................ B67D 1/1444; B67D 1/0004; B67D 2001/0094; B67D 2001/075
See application file for complete search history.

(56) References Cited

U.S. PATENT DOCUMENTS 667,301 A  *  2/1901  Dredge ................ B67D 1/1444
                                                    137/597
2,458,230 A     1/1949  Warcup
(Continued)

FOREIGN PATENT DOCUMENTS

DE         43 21 034 A1      1/1995

OTHER PUBLICATIONS

European Patent Office, International Search Report for International Application No. PCT/US2022/018683, dated Sep. 20, 2022.
(Continued)

*Primary Examiner* — Jason K Niesz
(74) *Attorney, Agent, or Firm* — Burr & Forman LLP; Ryan M. Corbett

(57) ABSTRACT

A cleaning valve for cleaning a beverage dispensing device is provided. The cleaning valve may include a valve body having a valve opening, a valve lever coupled to the valve body and configured to move the valve body between a product dispense position and a sanitize position, a product port configured to alternatively output a beverage product and a sanitizer based on a position of the valve lever, and a sanitizer port configured to receive the sanitizer from a sanitizer reservoir. The valve opening may be configured to create a first fluid communication path when the valve lever is in the product dispense position to allow the beverage product to output from the product port, and may be configured to create a second fluid communication path when the valve lever is in the sanitize position to allow the sanitizer to output from the product port.

13 Claims, 10 Drawing Sheets

(56) References Cited

U.S. PATENT DOCUMENTS 8,479,955 B2* 7/2013 Vesborg .............. B67D 1/1252
  222/105
2019/0352164 A1* 11/2019 Katz .................... B08B 9/0325

OTHER PUBLICATIONS

Communication Relating to the Results of the Partial International Search, European Patent Office, Jul. 4, 2022, International Application No. PCT/US2022/018683.

* cited by examiner

SECTION B-B
SCALE 1.5

BEVERAGE DISPENSING DEVICE WITH CLEANING VALVE

CROSS-REFERENCE TO RELATED APPLICATION

This application claims the benefit of U.S. Provisional Patent Application No. 63/156,323, filed on Mar. 3, 2021, which is incorporated herein by reference in its entirety

FIELD

The present disclosure relates generally to a device for dispensing beverages, and particularly to a beverage dispensing device that allows for easier cleaning of the beverage path.

BACKGROUND

Many beverage dispensing devices are bag-in-box (BIB) systems that produce a beverage by mixing a product that is often in the form of a syrup, with a base liquid such as water. The product syrup is often provided in a bag typically made of a flexible plastic or other material, which is contained within a box that may be made of cardboard or other materials. Such devices typically use a pump to draw the syrup out of the BIB, and mixes the syrup with liquid and/or gases to form a beverage that is dispensed via an outlet port.

The BIB typically includes a coupling by which the BIB can be coupled to the pump and a product line through which the product syrup is transported to a mixer where it is mixed with a base liquid. The path of the product syrup from the BIB to the outlet port frequently needs to be sanitized to prevent bacteria growth. To sanitize the product path, the BIB is de-coupled from the sanitizing path, and sanitizing equipment is coupled to the sanitizing path. Sanitizer is then circulated through the product path and discarded through the outlet port. However, it is inconvenient to disconnect BIBs and connect sanitizing equipment, especially for dispensing devices that may have several BIBs and associated product paths that need to be sanitized. De-coupling and re-coupling BIBs can be messy and time-consuming. In addition, sanitizing equipment is often separate from the beverage dispensing device, and requires components in addition to the beverage dispensing components, such as a sanitizer container, adapter hoses, and various couplings to couple the sanitizer equipment to the product paths. Accordingly, there is a need to overcome these challenges and others in dispensing various products.

SUMMARY

According to an aspect of one or more exemplary embodiments, there is provided a cleaning valve that may include a valve body having a valve opening, a valve lever coupled to the valve body and configured to move the valve body between a product dispense position and a sanitize position, a product port configured to alternatively output a beverage product and a sanitizer based on the position of the valve lever, and a sanitizer port configured to receive the sanitizer from a sanitizer reservoir. The valve opening may be configured to create a first fluid communication path when the valve lever is in the product dispense position to allow the beverage product to output from the product port, and the valve opening may be configured to create a second fluid communication path when the valve lever is in the sanitize position to allow the sanitizer to output from the product port. When the valve lever is in the product dispense position, the valve body may prevent the sanitizer from being output from the product port. When the valve lever is in the sanitize position, the valve body may prevent the beverage product from being output from the product port. The valve body may be configured to rotate between the product dispense position and the sanitize position. The dispense position may be located at an approximately ninety degree rotation with respect to the sanitize position.

According to an aspect of one or more exemplary embodiments there may be provided a beverage dispensing device that may include a shuttle configured to receive a beverage-in-box (BIB) container containing a beverage product, a sanitizer reservoir configured to contain sanitizer, a cleaning valve coupled to the shuttle and in fluid communication with the BIB container and the sanitizer reservoir, wherein the cleaning valve may include a valve lever configured to switch between a product dispense position and a sanitize position. The beverage dispensing device may also include an actuator configured to cause the beverage product to be output when the valve lever is in the product dispense position, and configured to cause the sanitizer to be output when the valve lever is in the sanitize position. The beverage dispensing device may also include an outer housing and an internal compartment contained within the outer housing. The shuttle may be configured to be disposed in a first position at least partially within the internal compartment when the valve lever is in the product dispense position. The valve lever may be configured to engage a rim portion of the internal compartment when the valve lever is in the sanitize position, and maintain the shuttle in a second position when the valve lever is in the sanitize position. The beverage dispensing device may also include a lid. At least one of the shuttle and the BIB container may be configured to prevent the lid from fully closing when the valve lever is in the sanitize position. The shuttle may be hingedly coupled to the outer housing, and may be configured to rotate between the first position and the second position.

DETAILED DESCRIPTION OF EXEMPLARY EMBODIMENTS

Figure 1A:
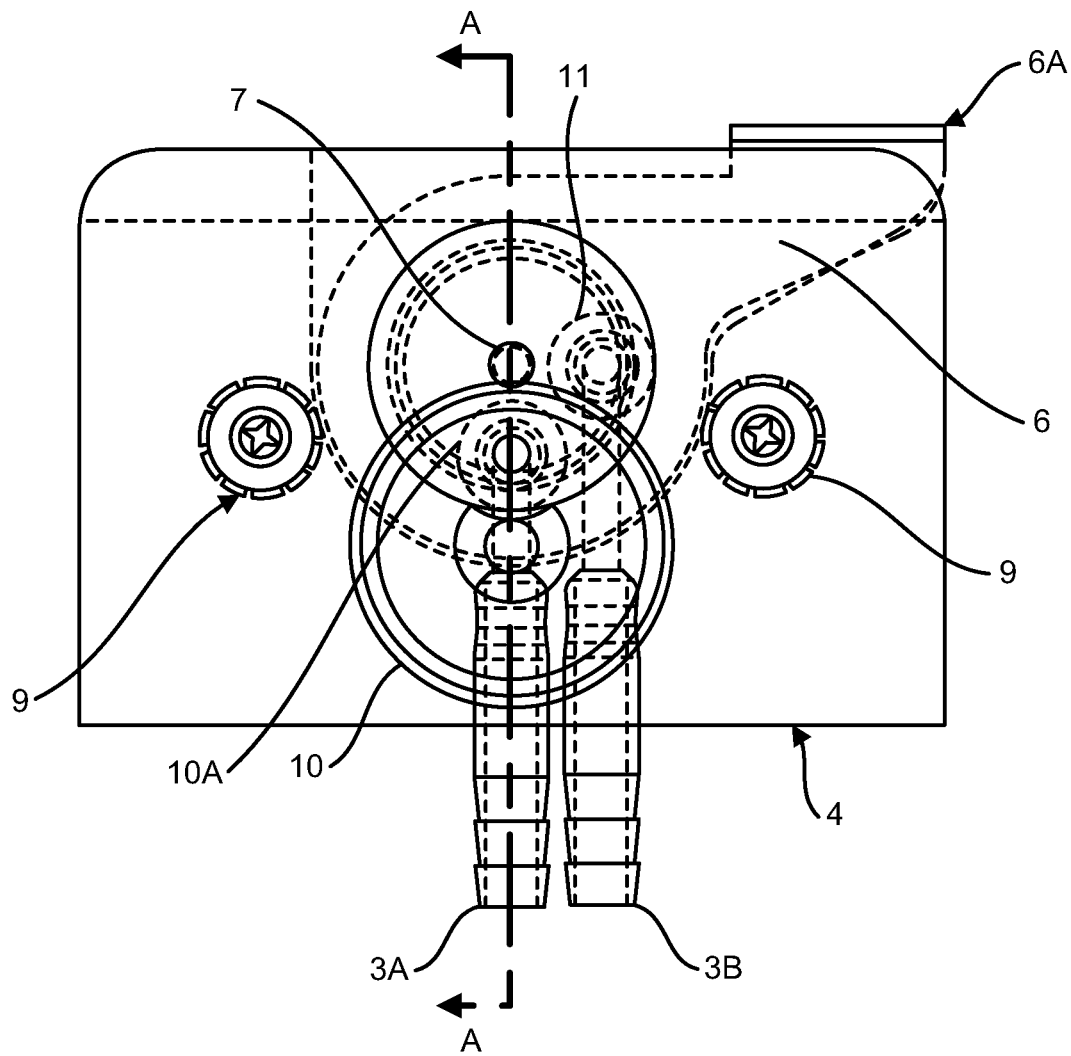
FIG. 1A illustrates a top view of a cleaning valve of a beverage dispensing device in a product dispensing position according to an exemplary embodiment.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 3:
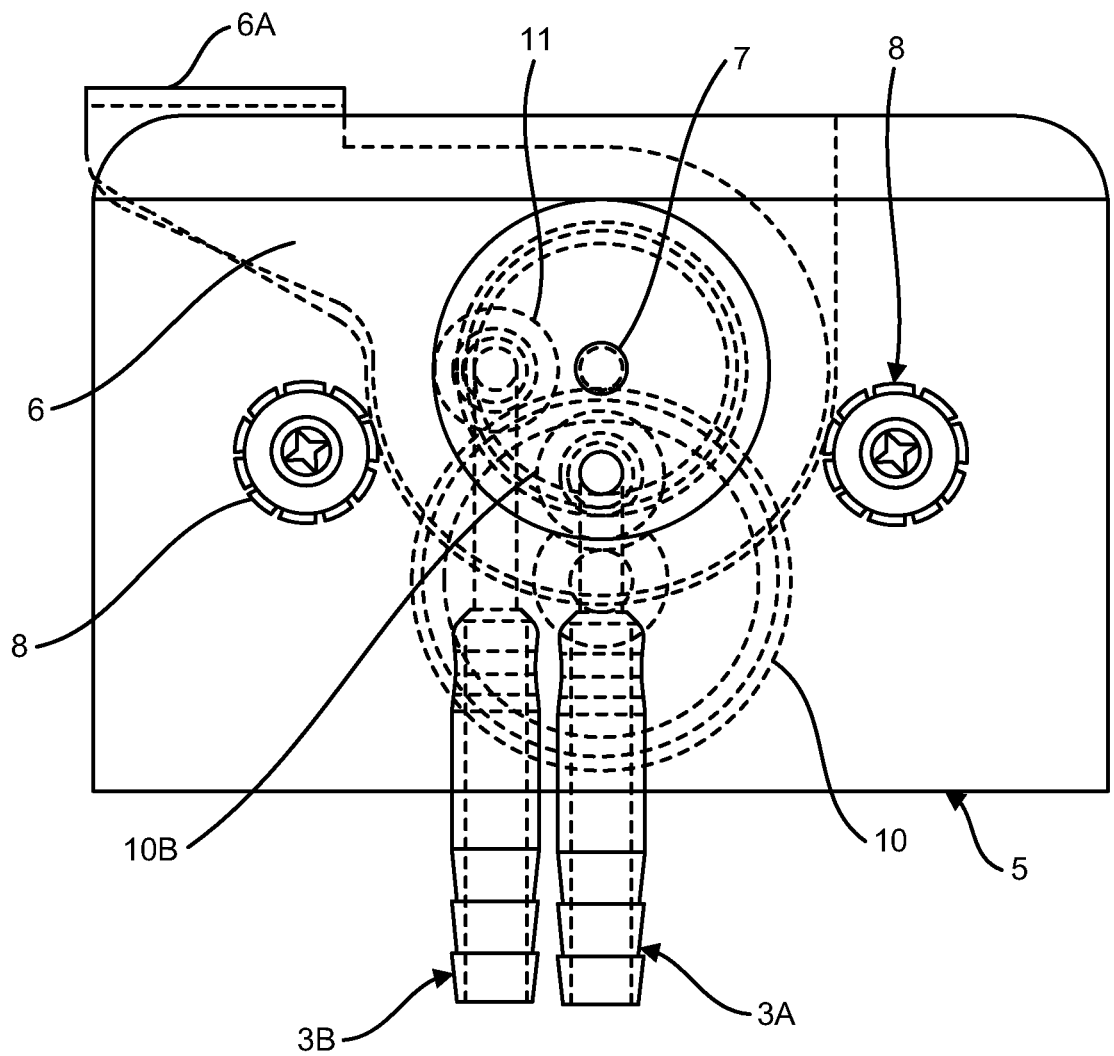
FIG. 3 illustrates a bottom view of a cleaning valve of a beverage dispensing device in a product dispensing position according to an exemplary embodiment.

FIGS. 1A and 3 show top and bottom views, respectively, of a cleaning valve of a beverage dispensing device according to an exemplary embodiment. Referring to FIGS. 1A and 3, the cleaning valve of the exemplary embodiment includes a valve base 5, a valve body 6 disposed within the valve base 5, a valve lever 6A extending outside the valve base 5, an axle 7 about which the valve body 6 can rotate, and a valve cover 4 coupled to the valve base 5 via two bolts 9 and two nuts 8 that are configured to be coupled to the two bolts 9, respectively. The cleaning valve may also include a product port 3A having a first end disposed within valve base 5 and a second end that extends outside of the valve base 5. The product port 3A may be configured to allow a beverage product, such as concentrate syrup, to flow through it. For example, the product port 3A may be in fluid communication with a pump that transports the beverage product so that it can be mixed with a base liquid, such as water. The cleaning valve of the exemplary embodiment may also include a sanitizer port 3B having a first end located within the valve base 5 and a second end that extends outside of the valve base 5. The sanitizer port 3B may be in fluid communication with a sanitizer reservoir, and may be configured to allow a sanitizer, such as a liquid sanitizer, to flow through it.

The cleaning valve of the exemplary embodiment may include a beverage coupler 10 that is configured to receive a beverage product. For example, the beverage coupler 10 may be a BIB fitment configured to receive beverage syrup from a BIB. The beverage coupler 10 may include a beverage opening 10A that may be located near the bottom of the beverage coupler 10, and may allow the beverage product to flow out of the beverage coupler 10, as explained in more detail below with reference to FIG. 1B.

Figure 1B:
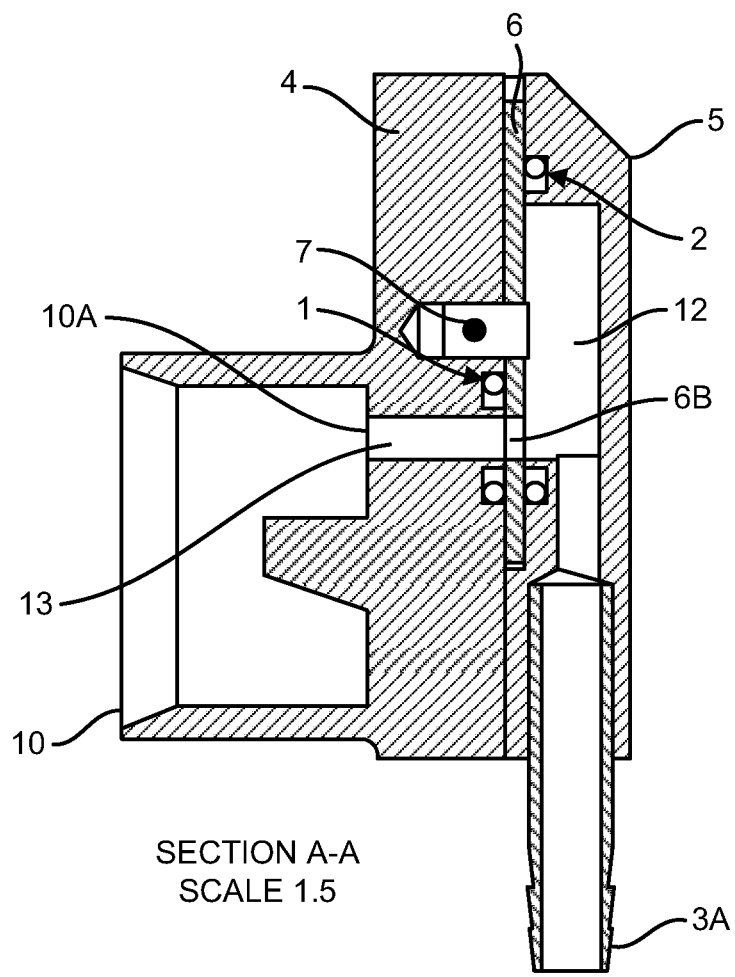
FIG. 1B illustrates a cross-sectional view along line A-A of the exemplary cleaning valve of FIG. 1A.

FIG. 1B shows a cross-sectional view taken along line A-A of the exemplary cleaning valve of FIG. 1. As shown in FIG. 1B, beverage opening 10A is in fluid communication with a channel 13 that allows the beverage product to flow to a lower compartment 12, from which it is extracted via a vacuum force provided by the pump (not shown) through product port 3A. When the valve lever 6A is in the product dispense position (as shown in FIGS. 1A, 1B, 3, and 4), a valve opening 6B contained within the valve body 6 is in fluid communication with the beverage opening 10A and the lower compartment 12 to allow the beverage product to flow through a first fluid communication path that includes the beverage opening 10A, channel 13, valve opening 6B, lower compartment 12, and product port 3A. The pump (not shown) may draw the beverage product out of the lower compartment 12 and through product port 3A, after which the beverage product may be mixed with a base liquid, such as water or coffee, and dispensed through an outlet port.

Figure 2A:
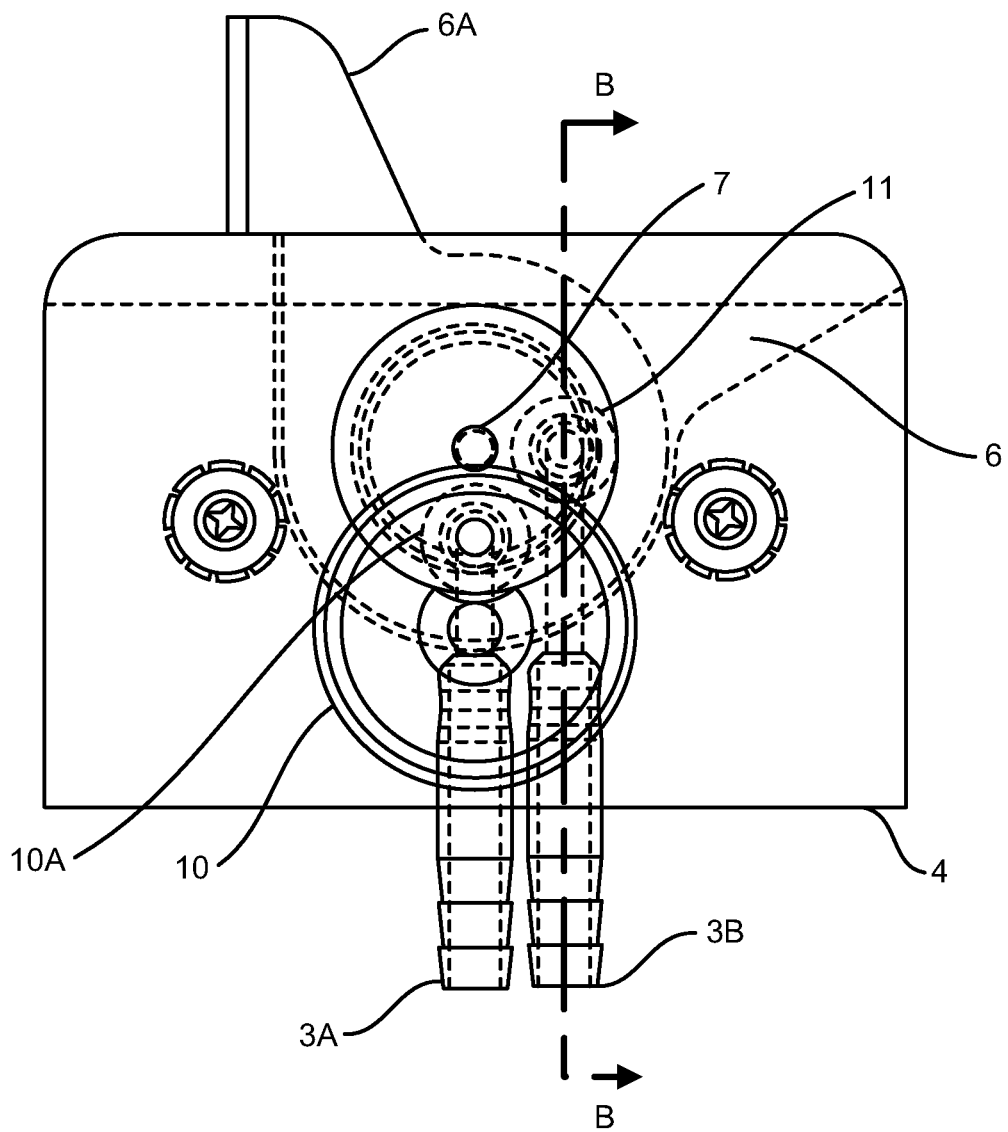
FIG. 2A illustrates a top view of a cleaning valve of a beverage dispensing device in a sanitize position according to an exemplary embodiment.
Figure 2B:
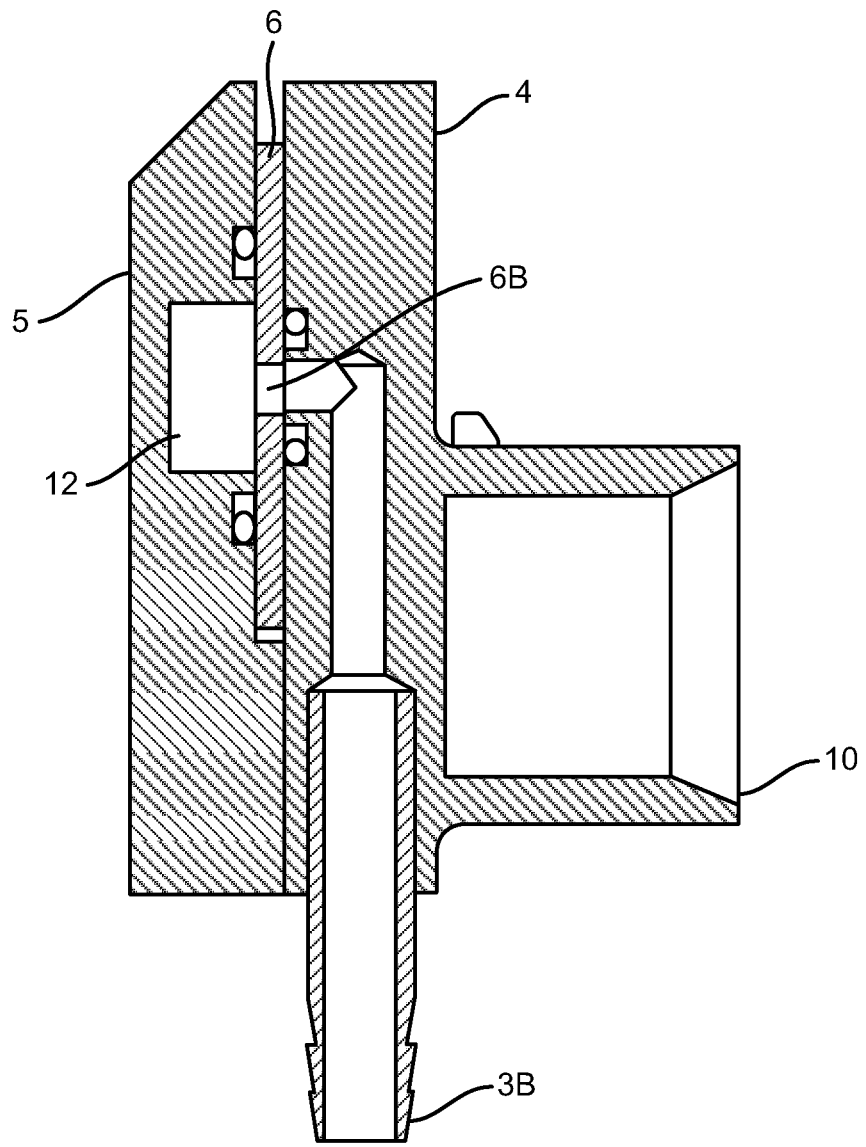
FIG. 2B illustrates a cross-section view along line B-B of the exemplary cleaning valve of FIG. 2A.
Figure 5:
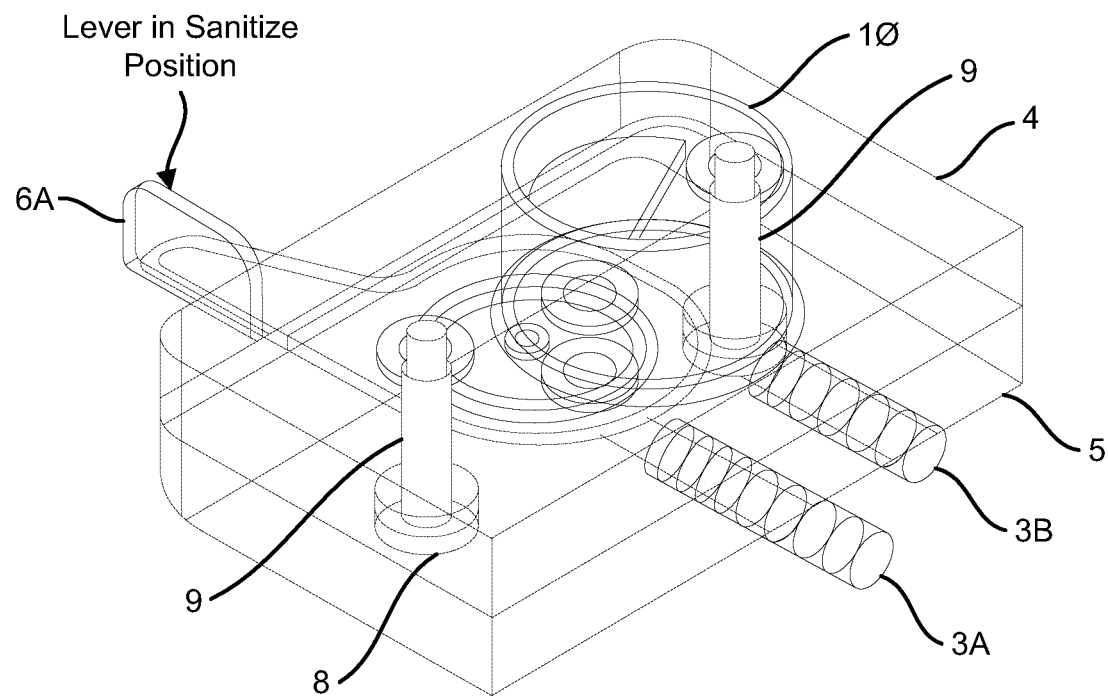
FIG. 5 illustrates a perspective view of a cleaning valve of a beverage dispensing device according to an exemplary embodiment in a sanitize position.

When the valve lever 6A is rotated, as shown in FIGS. 2A, 2B, and 5, the valve opening 6B moves approximately 90 degrees so that it is substantially aligned with a sanitizer opening 11 disposed at the first end of the sanitizer port 3B to form a fluid communication path with the sanitizer opening 11. By rotating the valve opening 6B to the sanitize position shown in FIG. 5 (by moving valve lever 6A), the valve body 6 prevents the beverage product from passing through beverage opening 10A and channel 13 to the lower compartment 12. Rather, as shown in FIG. 2B, the valve opening 6B creates a second fluid communication path with sanitizer port 3B and lower compartment 12 to allow sanitizer to enter the lower compartment 12 from the sanitizer port 3B. The sanitizer is then further pumped from the lower compartment 12 out through the product port 3A to sanitize the valve opening 6B, the lower compartment 12, and the product port 3A.

Figure 4:
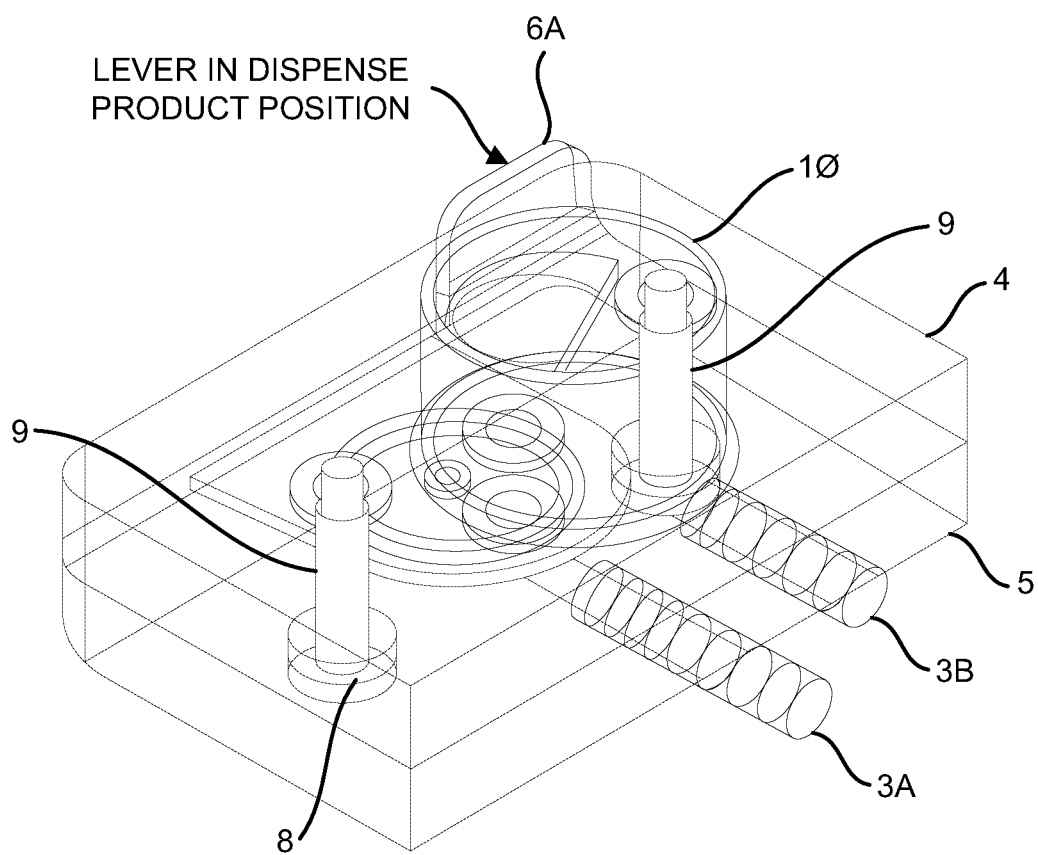
FIG. 4 illustrates a perspective view of a cleaning valve of a beverage dispensing device according to an exemplary embodiment in a dispense product position.

FIGS. 4 and 5 show perspective views of a cleaning valve according to an exemplary embodiment with the valve lever 6A in the product dispense position and the sanitize position, respectively. As shown in FIG. 4, the valve lever 6A is rotated to the right so that it substantially abuts the side of the valve base 5 and the valve cover 4. In this position, the valve opening 6B is in fluid communication with the beverage opening 10A, so that the beverage product can be transported from a BIB coupled to the beverage coupler 10, through beverage opening 10A, channel 13, and valve opening 6B to the lower compartment 12, as shown in FIG. 1B. The pump (not shown) provides a vacuum force to draw the beverage product from the lower compartment 12 through product port 3A, after which the beverage product is ultimately mixed with a base liquid and output via an outlet port. In the product dispense position, the valve body 6 prevents sanitizer from entering the product path by blocking the fluid communication path from the sanitizer port 3B to the lower compartment 12.

As shown in FIG. 5, the valve lever 6A is rotated to the left so that it extends substantially perpendicularly with respect to the valve base 5 and the valve cover 4. When the valve lever 6A is in this position, the valve opening 6B provides a fluid communication path from the sanitizer port 3B to the lower compartment 12, as shown in FIG. 2B. In this position, sanitizer can be provided from a sanitizer reservoir through sanitizer port 3B, and further through valve opening 6B into the lower compartment 12, from which it is pumped through the product port 3A. After the sanitizer exits the product port 3A, the sanitizer continues along the product path through the portion at which the beverage product is mixed with a base liquid, and is dispensed through the outlet port. Therefore, the sanitizer is able to traverse and sanitize the entire product path that the beverage product contacts during dispensing. When the valve lever 6A is in the sanitize position, the valve body 6 prevents beverage product from entering the product path by blocking the fluid communication between the beverage opening 10A (and channel 13) and the lower compartment 12.

Figure 6:
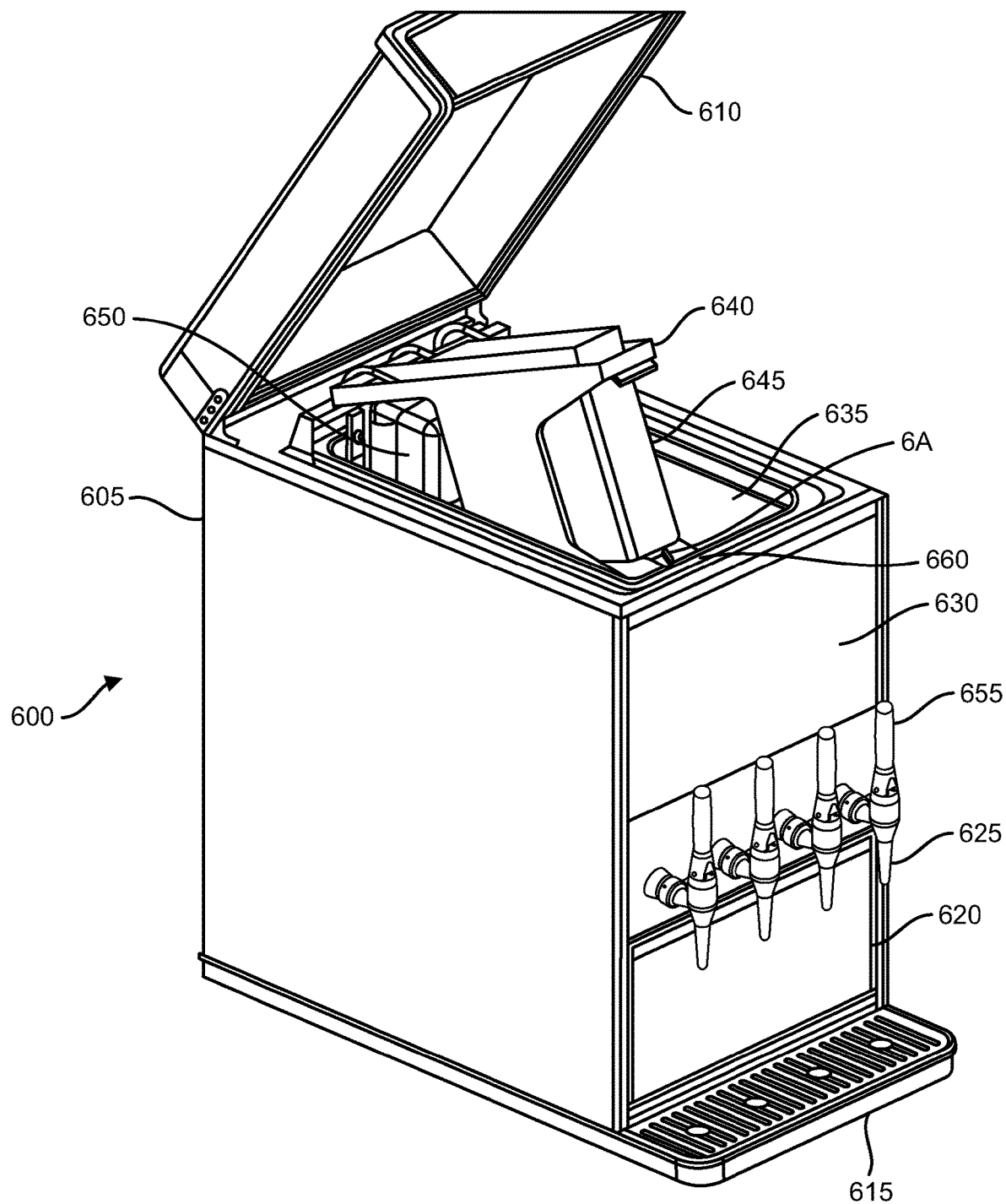
FIG. 6 illustrates a perspective view of a beverage dispensing device according to an exemplary embodiment.

FIG. 6 depicts a beverage dispensing device 600 according to an exemplary embodiment, which may include the cleaning valve according to the exemplary embodiments shown in FIGS. 1A-5. Referring to FIG. 6, the exemplary beverage dispensing device 600 may include an outer housing 605, a lid 610 that may be hingedly coupled to the outer housing 605, a drip tray 615 removably coupled to the outer housing 605, a plurality of outlet ports 625 coupled to a front face of the outer housing 605, a backsplash 620 coupled to the front face of the outer housing 605 between the drip tray 615 and the plurality of outlet ports 625. The beverage dispensing device 600 may also include a plurality of actuators 655 that may be respectively coupled to the plurality of outlet ports 625, and configured to activate a pump to draw a beverage product or sanitizer from the lower compartment 12 of the cleaning valve. The beverage dispensing device 600 may include an internal compartment 635 that is configured to include one or more shuttles 640 that are each configured to receive a BIB containing a beverage product. A cleaning valve, such as the exemplary cleaning valve shown in FIG. 1A, may be coupled to the bottom of each of the one or more shuttles 640 so that the beverage coupler 10 of each cleaning valve may be coupled to an output fitting of the BIB. The internal compartment 635 may also include a sanitizer reservoir 650 that is configured to contain a sanitizer, such as a liquid sanitizer, that may be provided via one or more tubes to the sanitizer port 3B of the one or more cleaning valves.

Figure 8:
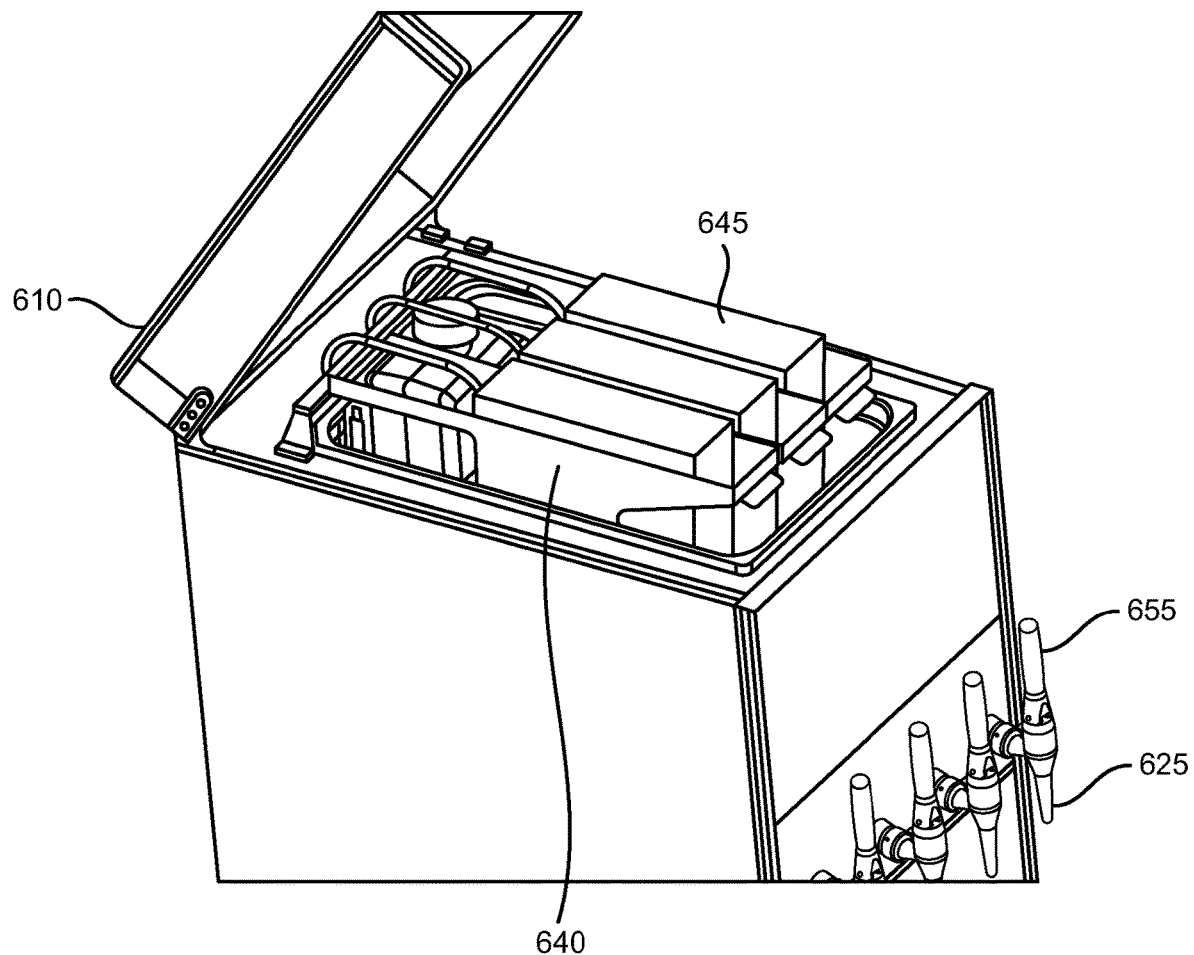
FIG. 8 illustrates an alternate perspective view of a beverage dispensing device according to an exemplary embodiment.

In operation, when the valve lever 6A is in the product dispense position (see FIG. 4), the one or more shuttles 640 fit within internal compartment 635 so that the lid 610 can be closed. For example, as shown in FIG. 8, the beverage dispensing device includes multiple shuttles 640 each containing a BIB 645, and each disposed in a first position within the internal compartment 635 to allow the lid 610 to close. Although the shuttles 640 are described as being disposed "within" the internal compartment 635, one skilled in the art would understand that the shuttles 640 may not be fully enclosed by the internal compartment 635, as shown in FIG. 8. When one or more actuators 655 are engaged, for example, by being pulled toward the user facing the beverage dispensing device 600, a pump is activated to provide a vacuum force that draws a beverage product from the BIB 645, through beverage coupler 10, beverage opening 10A, and valve opening 6B into lower compartment 12. The vacuum force further extracts the beverage product through product port 3A, where it is mixed with a base liquid and output through an output port 625 corresponding to the actuator 655 that was engaged.

Drip tray 615 may include a perforated top surface that allows excess beverage to enter a drain that may be located at the bottom of the drip tray 615. The drip tray 615 may be removably coupled to a drain line (not shown) that may be contained within the outer housing 605 that may output the excess beverage to a sink or other drainage line or receptacle. Backsplash 625 may be magnetically coupled to the front surface of the outer housing 605, and may include a bottom lip portion that extends outwardly from the outer housing 605 to direct any liquid that contacts the backsplash 625 to the drip tray 615. The internal compartment 635 may also include a drain, which may be located at the bottom surface of the internal compartment 635. The internal compartment drain may also be coupled to a drain line contained within the outer housing 605, which allows the internal compartment 635 and the components contained within it to be cleaned more easily.

Figure 7:
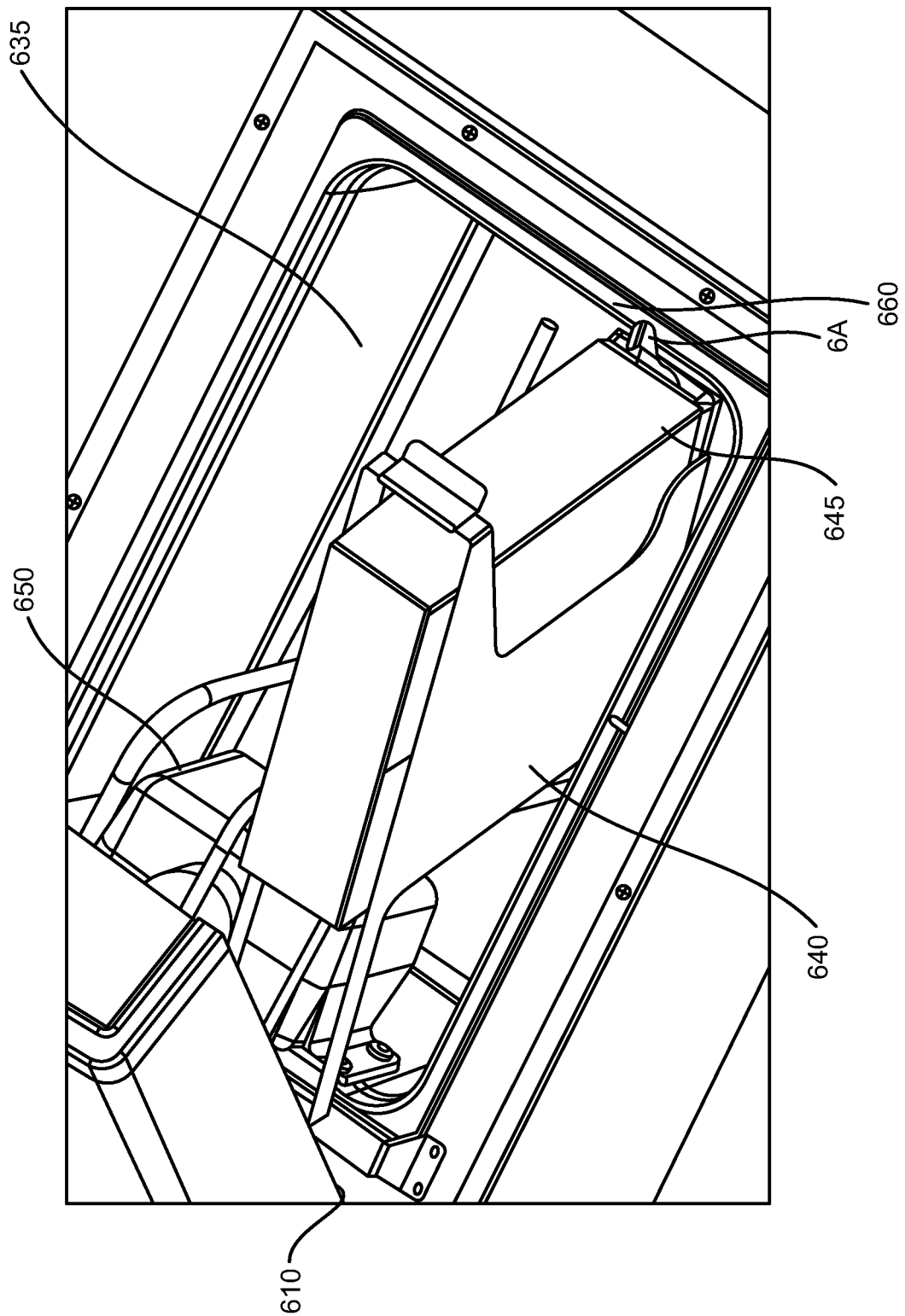
FIG. 7 illustrates a top view of a beverage dispensing device according to an exemplary embodiment.

FIG. 7 shows a top view of the internal compartment 635 of a beverage dispensing device according to an exemplary embodiment. As shown in FIG. 7, the valve lever 6A is in the sanitize position (see also FIG. 5) and is extended substantially perpendicularly with respect to the BIB 645 and the cleaning valve underneath the BIB 645. The shuttle 640 may be hingedly coupled to the back of the internal compartment 635 so that the shuttle 640 can rotate to allow a front end of the BIB 645 to be raised upward, partially out of the internal compartment 635. When the valve lever 6A in the sanitize position, the valve lever 6A contacts a rim portion 660 of the internal compartment 635 that prevents the shuttle 640 from lowering into the dispensing position within the internal compartment 635. Therefore, according to the exemplary embodiment, the valve lever 6A prevents the shuttle 640 from being lowered down into internal compartment 635, which prevents the lid 610 from closing. A user attempting to dispense a beverage would therefore be more likely to notice that the valve lever 6A is not in a product dispensing position if the lid 610 is open and shuttles 640 are disposed partially outside of the inner compartment 635.

Referring to FIGS. 2A, 2B, 6 and 7, when the valve lever 6A is in the sanitize position and the shuttle 640 is raised partially out of the internal compartment, the valve opening 6B creates a fluid communication path between the sanitizer port 3B and the lower compartment 12. When actuator 655 is engaged (e.g., by the user pulling the actuator 655 away from the outer housing 605), a pump is engaged to provide a vacuum force that draws the sanitizer from the sanitizer reservoir 650, through valve opening 6B, into lower compartment 12, out through product port 3B, through a mixing location where the beverage product is typically mixed with a base liquid (not shown), and out through outlet port 625. By incorporating the sanitizer reservoir 650 within the beverage dispensing device 600, and including a cleaning valve that can switch between allowing beverage product and sanitizer to flow, the product path can be sanitized without connecting and disconnecting sanitizing equipment every time the beverage dispensing device needs to be sanitized.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:
1. A cleaning valve comprising:
   a valve body that includes a valve opening;
   a valve lever coupled to the valve body and configured to move the valve body between a product dispense position and a sanitize position;
   a product port configured to alternatively output a beverage product and a sanitizer based on a position of the valve lever; and
   a sanitizer port configured to receive the sanitizer from a sanitizer reservoir;
   wherein the valve opening is configured to create a first fluid communication path when the valve lever is in the product dispense position to allow the beverage product to output from the product port, wherein the first fluid communication path includes a first end configured to be coupled to a container for the beverage product, and a second end coupled to the product port;
   wherein the valve opening is configured to create a second fluid communication path when the valve lever is in the sanitize position to allow the sanitizer to output from the product port; and
   wherein the second fluid communication path allows sanitizer to flow from the first end of the first fluid communication path to the second end of the first fluid communication path.

2. The cleaning valve of claim 1, wherein when the valve lever is in the product dispense position, the valve body prevents the sanitizer from being output from the product port.

3. The cleaning valve of claim 1, wherein when the valve lever is in the sanitize position, the valve body prevents the beverage product from being output from the product port.

4. The cleaning valve of claim 1, where the valve body is configured to rotate between the product dispense position and the sanitize position.

5. The cleaning valve of claim 4, wherein the dispense position is located at an approximately ninety degree rotation with respect to the sanitize position.

6. A beverage dispensing device comprising:
- a shuttle configured to receive a beverage-in-box (BIB) container containing a beverage product;
- a sanitizer reservoir configured to contain sanitizer;
- a cleaning valve coupled to the shuttle and in fluid communication with the BIB container and the sanitizer reservoir, said cleaning valve including a valve lever configured to switch between a product dispense position and a sanitize position; and
- an actuator configured to cause the beverage product to be output via a first fluid communication path when the valve lever is in the product dispense position, and configured to cause the sanitizer to be received from the sanitizer reservoir and output via a second fluid communication path when the valve lever is in the sanitize position;
- wherein the second fluid communication path allows sanitizer to flow from a first end of the first fluid communication path coupled to the BIB container to a second end of the first fluid communication path from which the beverage product is output.

7. The beverage dispensing device of claim 6, further comprising:
- an outer housing; and
- an internal compartment within the outer housing;
- wherein the shuttle is configured to be disposed in a first position least partially within the internal compartment when the valve lever is in the product dispense position.

8. The beverage dispensing device of claim 7, wherein the valve lever is configured to engage a rim portion of the internal compartment when the valve lever is in the sanitize position, and maintain the shuttle in a second position when the valve lever is in the sanitize position.

9. The beverage dispensing device of claim 8, further comprising a lid;
- wherein at least one of the shuttle and the BIB container are configured to prevent the lid from fully closing when the valve lever is in the sanitize position.

10. The beverage dispensing device of claim 8, wherein the shuttle is hingedly coupled to the outer housing, and is configured to rotate between the first position and the second position.

11. A beverage dispensing device comprising:
- a shuttle configured to receive a beverage-in-box (BIB) container containing a beverage product;
- a sanitizer reservoir configured to contain sanitizer;
- a cleaning valve coupled to the shuttle and in fluid communication with the BIB container and the sanitizer reservoir, said cleaning valve including a valve lever configured to switch between a product dispense position and a sanitize position;
- an actuator configured to cause the beverage product to be output when the valve lever is in the product dispense position, and configured to cause the sanitizer to be output when the valve lever is in the sanitize position;
- an outer housing; and
- an internal compartment within the outer housing;
- wherein the shuttle is configured to be disposed in a first position least partially within the internal compartment when the valve lever is in the product dispense position; and
- wherein the valve lever is configured to engage a rim portion of the internal compartment when the valve lever is in the sanitize position, and maintain the shuttle in a second position when the valve lever is in the sanitize position.

12. The beverage dispensing device of claim 11, further comprising a lid;
- wherein at least one of the shuttle and the BIB container are configured to prevent the lid from fully closing when the valve lever is in the sanitize position.

13. The beverage dispensing device of claim 11, wherein the shuttle is hingedly coupled to the outer housing, and is configured to rotate between the first position and the second position.

* * * * *